United States Patent [19]
Vogt et al.

[11] Patent Number: 4,687,350
[45] Date of Patent: Aug. 18, 1987

[54] SEALED BEARING FOR RING ROLLER OF COLD PILGER ROLLING MILL

[75] Inventors: Günter Vogt; Heinrich Winter, both of Schweinfurt, Fed. Rep. of Germany

[73] Assignee: SKF GmbH, Schweinfurt, Fed. Rep. of Germany

[21] Appl. No.: 796,283

[22] Filed: Nov. 8, 1985

[30] Foreign Application Priority Data

Nov. 9, 1984 [DE] Fed. Rep. of Germany ....... 3440957

[51] Int. Cl.[4] .......................... F16C 33/76; F16J 15/38
[52] U.S. Cl. .................................... 384/481; 384/626; 277/83; 277/92
[58] Field of Search ................. 384/94, 130, 135, 139, 384/465, 472, 477, 478, 481, 607, 626; 277/83, 84, 92, 95

[56] References Cited

U.S. PATENT DOCUMENTS

| | | | |
|---|---|---|---|
| 3,073,657 | 1/1983 | Oxford | 384/481 |
| 3,216,513 | 11/1965 | Robbins et al. | 384/94 X |
| 3,510,138 | 5/1970 | Bowen et al. | 384/135 |
| 3,572,452 | 3/1971 | Winberg | 384/94 X |

Primary Examiner—Stuart S. Levy
Assistant Examiner—David Werner
Attorney, Agent, or Firm—Rosen, Dainow & Jacobs

[57] ABSTRACT

A sealed bearing arrangement for the ring rollers of a cold rolling mill is provided with a rolling bearing mounted on a journal of a rolling shaft and seated in the bore of a chock, and a pair of housing covers fastened to said chock on respective sides of said rolling bearing. Each of the housing covers has a bore in which a pair of sliding rings and a pair of O-ring seals are arranged. The sliding rings of each pair have mutually abutting end surfaces and respective outer conical circumferential surfaces which are resiliently supported by the respective separate O-ring seals. The O-ring seals in turn are supported by a conical bore surface formed on the corresponding housing cover and by a conical inner surface of a washer seated adjacent the inner ring of the bearing respectively. At least one shim ring is inserted between the side surface of a ring of the rolling bearing and a supporting shoulder surface of one of the housing covers or washers.

6 Claims, 1 Drawing Figure

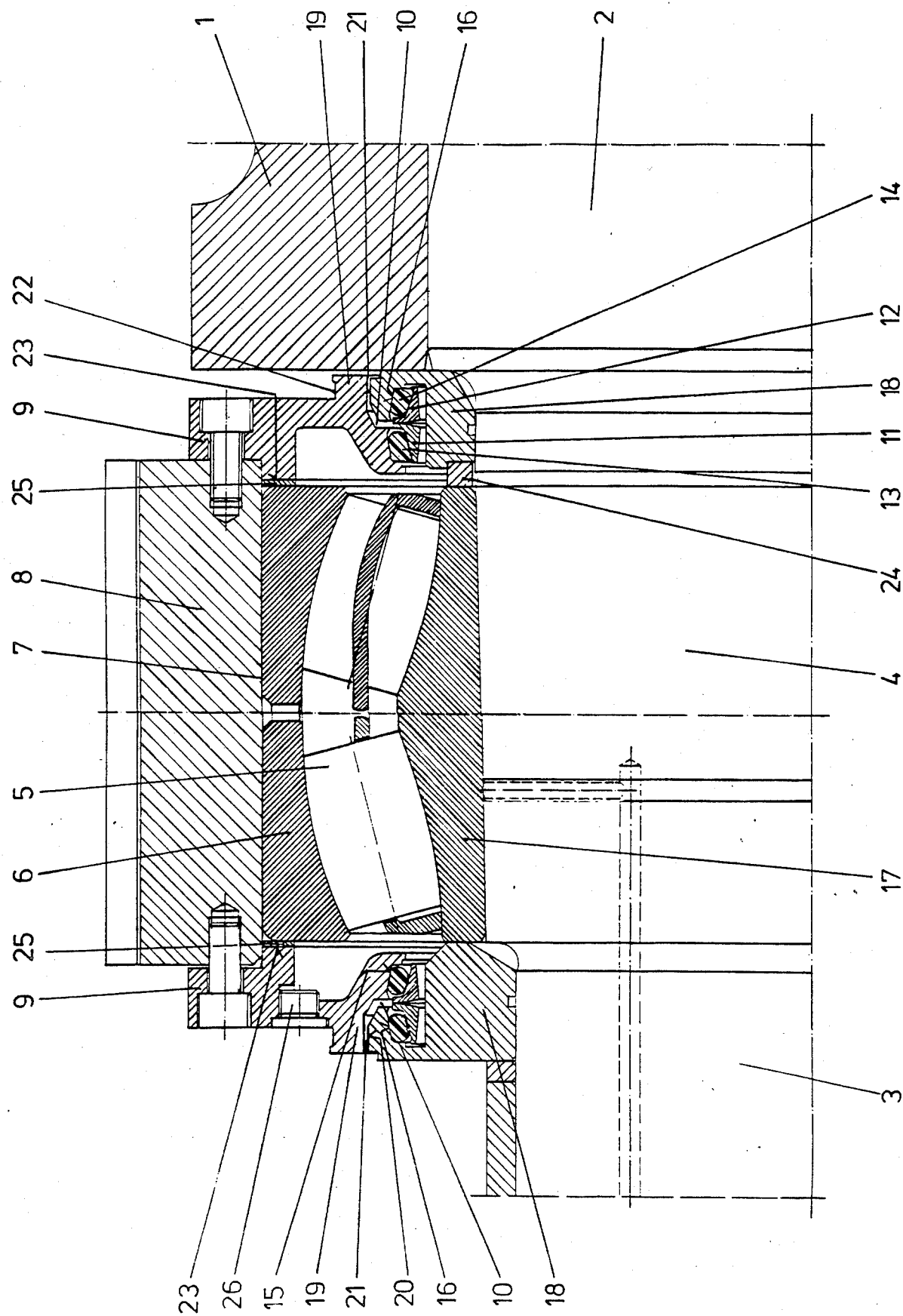

SEALED BEARING FOR RING ROLLER OF COLD PILGER ROLLING MILL

FIELD OF THE INVENTION

The invention relates to a sealed bearing for the ring roller of a cold pilger rolling mill.

BACKGROUND OF THE INVENTION

Cold pilger rollers are used to draw out a rough-pierced tube blank over a fixed mandrel, while two grooved rollers, which grasp the blank from above and below, perform back and forth rolling contact at regular intervals. The rollers maintain their motion relative to the roll stand, in which the rollers are mounted by means of bearings. The rollers are rotated with changing rotation direction, in their back and forth motion, by means of two racks mounted thereon engaging two pinions mounted on the machine frame. The stroke of the roll stand and therewith the rollers effect a crank driving force.

In accordance with known bearing arrangements for the ring rollers of cold pilger rolling mills, labyrinth sealing rings or shaft sealing rings are used to seal the bearings. In the first case it is not possible to lubricate the bearing with oil, which is essential in the case of an ever-increasing number of rotational direction changes per unit of time in the reversing operation with superimposed horizontal acceleration and deceleration. Also the customary radial shaft sealing ring is not especially adapted for oil lubrication in these applications, since the sealing lips lift off from the sealing surfaces under the influence of acceleration and deceleration forces, so that oil escapes from the bearing and coolant as well as contaminants can enter the bearing. This leads to premature failure of the bearing.

SUMMARY OF THE INVENTION

The object of the invention is to provide a sealed bearing of the aforementioned type which can be lubricated with oil and which functions perfectly after a great number of changes in rotational direction over time, without the escape of oil and the penetration of coolant, contaminants and the like.

This object is achieved by arranging a pair of sliding rings and a pair of O-ring seals in the bore of each housing cover fastened to the chock on respective sides of the rolling bearing mounted therein. The sliding rings of each pair are mutually abutting and are resiliently supported by a corresponding O-ring seal. The O-ring seals are respectively supported by a conical bore surface formed in the corresponding housing cover and a conical inner surface formed in a corresponding washer seated adjacent the inner ring of the bearing. Shim rings are provided between the inner ring of the bearing and the washer nearest to the ring roller and between the outer ring of the bearing and the housing covers.

By the use of sliding ring seals, a most effective sealing is achieved for preventing the escape of oil and the admission of coolant, contaminants, etc. as the ring rollers and bearings undergo continuous and high-frequency reversal of the rotation direction. To this end, the pair of O-ring seals resiliently engage the corresponding pair of sliding rings arranged between each housing cover and the corresponding washer. In order to precisely adjust the position of the bearing and thereby the ring roller, on the one hand, and the pressing forces on the sliding ring seals, on the other hand, shim rings are inserted between the side surfaces of the inner or outer ring of the bearing and the opposing supporting shoulder of the opposing housing cover or washer.

In accordance with a further feature of the invention, in order to improve the sealing action, the housing cover is provided with an axially outwardly directed annular projection which overlaps the outer circumferential surface of the corresponding washer, forming a narrow sealing gap therebetween. This sealing gap serves as an additional seal for the sliding sealing rings and prevents the admission of contaminants from outside.

Furthermore, in cold pilger rolling mills large quantities of liquid coolant impinge on the chock and run down the sides. In order to guide the fluid around the sealing positions, the axially directed annular projection of each housing cover is provided with a catch lip which encompasses the center axis of the ring roller. This catch lip forms an annular groove which diverts the fluid around the sealing positions and to a point underneath the chock.

BRIEF DESCRIPTION OF THE DRAWING

The preferred embodiment of the invention will be described in detail with reference to the drawing, which shows a sectional view of the drive side bearing of the ring roller of a cold pilger rolling mill.

DETAILED DESCRIPTION OF THE PREFERRED EMBODIMENT

The ring roller 1 is shrunk on a roller shaft 2 which is driven by a gear wheel (not shown) fitted on a projecting free end 3 thereof. On both sides of the ring roller 1 a rolling bearing 5—in this case a self-aligning rolling bearing—is fitted on an offset journal 4 of the roller shaft 2. Each rolling bearing 5 is arranged in the bore 7 of a chock 8 by way of the outer circumferential surface of the outer ring 6. Chock 8 is inserted in the roll stand (not shown in detail). The outer ring 6 of the rolling bearing is axially secured by means of the housing covers 9 screwed onto both sides of the chock 8. In the bore of each housing cover 9 a sliding ring seal 10 is inserted consisting of two sliding rings 11 and 12 which are resiliently supported by O-ring seals 13 and 14. The O-ring seal 13 abuts the conical bore surface 15 of the housing cover 9, while the O-ring seal 14 abuts a conical inner surface 16 of the washer 18 arranged adjacent the bearing inner ring 17 and fitted on the shoulder of the roller shaft 2. The housing cover 9 is provided with an axially outwardly directed annular projection 19, which forms an annular gap 21 with the outer circumferential surface 20 of the washer 18. The projection 19 is provided with a catch groove 22 on its perimeter which encircles the center shaft of the ring roller.

In order to precisely fix the position of the rolling bearing 5 and the ring roller 1 against the chock 8 and to exactly adjust the radial play of the rolling bearing, shim ring 24 is fitted between the inner ring 17 and the washer 18 adjacent the ring roller and shim rings 25 are fitted between the side surfaces of the outer ring 6 and the inwardly directed radial surfaces 23 of corresponding housing cover 9. The housing cover 9 on the side of chock 8 remote from ring roller 1 is provided with a feed opening 26. Oil for lubrication of the rolling bearing 5 can enter the bearing space by way of this feed opening 26 as needed, such that a predetermined oil level will not be exceeded.

What is claimed is:

1. In a sealed bearing arrangement for the rollers of a cold rolling mill, comprising a rolling bearing mounted on a journal of a rolling shaft and seated in the bore of a chock, and a separate housing cover fastened to each axial end of said chock adjacent the respective sides of said rolling bearing, each of said housing covers having a bore, and separate sealing means arranged in each of said bores; the improvement wherein said bearing has an inner ring and outer ring with opposite sides adjacent separate ones of said housing covers, each of said sealing means being comprised of first and second sliding rings and first and second O-ring seals, said rolling bearing further comprising first and second washers positioned radially inwardly of said first and second covers respectively and the respective first and second sliding rings and extending adjacent to opposite sides of said inner ring, said first and second sliding rings of each pair having mutually abutting end surfaces and having first and second outer conical circumferential surfaces respectively resiliently radially outwardly supported by the respective first and second O-ring seals, said first and second O-ring seals in turn being radially outwardly supported by conical bore surfaces formed on the respective housing cover and on the respective washer, said arrangement further comprising a shim ring inserted between a side surface of at least one of said rings of said rolling bearing and a supporting shoulder surface of the adjacent said housing cover or washer.

2. The bearing arrangement as defined in claim 1, wherein each of said housing covers has an axially outwardly directed annular projection which radially opposes an outer circumferential surface of a corresponding one of said washers such that a narrow sealing gap is formed therebetween.

3. The bearing arrangement as defined in claim 2, wherein an annular catch lip is arranged on the outer circumferential surface of said annular projection for forming a fluid-catching groove which encircles a center axis of said bearing arrangement.

4. The bearing arrangement of claim 1 wherein said shim ring is inserted between and abutting said inner ring and one of said washers.

5. The bearing arrangement of claim 4 further comprising a shim ring inserted between abutting said outer ring and one of said housing covers.

6. The bearing arrangement of claim 1 wherein said shim ring is arranged between and abutting said outer ring and one of said housing covers.

* * * * *